United States Patent

[11] 3,634,760

[72] Inventors Fernand R. C. Murtin
Paris;
Owen Storey, Jarcy, both of France
[21] Appl. No. 48,115
[22] Filed June 22, 1970
[45] Patented Jan. 11, 1972
[73] Assignee Societe Industrielle Electronique et d'Informatique
Paris, France

[54] FREQUENCY SPECTRUM ANALYZER WITH FFT COMPUTER
10 Claims, 4 Drawing Figs.

[52] U.S. Cl. .................................................. 324/77 R, 235/156
[51] Int. Cl. ................................................ G01r 23/16
[50] Field of Search ........................................ 324/57, 77; 235/156

[56] References Cited
UNITED STATES PATENTS
3,517,173  6/1970  Gilmartin, Jr. et al. ........ 324/77 X Primary Examiner—Edward E. Kubasiewicz
Attorney—Karl F. Ross ABSTRACT: A broad band of signal frequencies, whose power spectrum is to be analyzed by the Fast Fourier Transform (FFT) technique, is sampled by heterodyning with various beat frequencies $f_b$ and passage of the modulation products through a low-pass filter of bandwidth $b/2$ where $b$ represents the width of a subband substantially narrower than the overall band of width B. By concurrently performing the heterodyning operation in two parallel channels, with introduction of a 90° phase shift between beat and input frequencies in one of the channels, the two sidebands $f_b+f_x$ and $f_b-f_x$ (where $f_x$ represents any frequency within the selected subband $b$) can be separated in the outputs of the two channel filters. Frequency limit $b/2$ is selected in conformity with the capacity of an associated computer to handle the data from the FFT analysis of the subband spectrum. The sampling may be preceded by a transposition of the entire band B to a higher frequency range, in order to prevent any possible cluttering of the spectrum by harmonics of $f_b$.

Fernand R. C. Murtin
L. R. Owen Storey
INVENTORS.

BY Karl F. Ross

Attorney

FREQUENCY SPECTRUM ANALYZER WITH FFT COMPUTER

Our present invention relates to a signal analyzer adapted to operate over a broad band of frequencies to determine, for example, the power spectrum of mechanical or electrical phenomena such as vibration or electronic noise.

It is known that periodic or quasi-periodic phenomena can be analyzed by Fourier transformation, more specifically with the aid of an algorithm known as Fast Fourier Transform (FFT). Reference in this connection may be made, for example, to an article by E. O. Brigham & R. E. Morrow in the Dec. 1967 issue of *IEEE Spectrum*, pages 63–70.

In the programming of a computer for an FFT analysis it is necessary to take into consideration a limiting frequency F determined by the highest switching speed of which the computer is capable. Another important parameter is the storage capacity of the computer which limits the extent of the frequency range to be analyzed at one time with given degree of accuracy. It has therefore been necessary in such computerized analyzers to restrict the application of the FFT technique to frequency bands of width $B<F$ where F corresponds to half the sampling rate of the computer.

The expedient of subdividing a larger frequency band into relatively narrow subbands and shifting the latter to the zero-frequency region, which has been used successfully for analogue measurements, was considered impractical for digitized systems because of the need for filters with sharp frequency cutoff to separate not only the selected subband from the remainder of the spectrum but also the upper and lower sidebands thereof from each other in order to eliminate an ambiguity detrimental to FFT analysis.

The general object of our present invention is to provide in such a system a method of and means for enabling the computerized analysis of any subband of a larger frequency band, too wide to be analyzed directly, with simplified filtration.

A related object is to provide a system of the type in which the necessary frequency shift can be performed with the aid of local oscillators of other than strictly sinusoidal output.

These objects are realized, pursuant to one aspect of our present invention, by an analytical method involving the selection of a plurality of beat frequencies $f_b$ each centered in a respective subband of width $b$, with $b/2 \ll F$ where F is the above-defined limiting frequency; the band of incoming signal frequencies is then heterodyned with a selected beat frequency in two parallel channels, with a shifting of the phase of that beat frequency with reference to the phases of the signal frequencies by substantially 90° as between these channels to generate modulation products including a lower sideband and an upper sideband, the latter sideband being flipped into an overlapping position near the zero-frequency axis of an amplitude/frequency diagram. As will be shown hereinafter, signal frequencies within subband $b$ originally symmetrical with reference to beat frequency $f_b$ are distinguished by their phase in the two channels so that, upon a filtering of all frequencies above $b/2$ from the modulation products of each channel and conversion of the remainder of these modulation products into digital data, the computer receiving these data will have all the necessary information to perform the desired Fourier transformation.

According to a more specific feature of our invention, which is especially useful when the original band B starts at zero or near-zero frequencies, this band is first transposed to a range of higher frequencies by modulation of its signal frequencies with a shift frequency $f_o>B$. This eliminates the possibility that higher harmonics of a beat frequency $f_b$ might show up within the band B so as to clutter the spectrum to be analyzed.

Since there will generally be only one shift frequency $f_o$, in contradistinction to the possibly very numerous beat frequencies $f_b$, it is advantageous to introduce the 90° phase shift by transmitting this shift frequency $f_o$ to respective modulators in the two channels in the form of two oscillations in quadrature relationship with each other.

In order to reconstitute the two sidebands together forming the subband centered on the selected beat frequency, the modulation products may be additively and subtractively combined, after a relative 90° phase shift, before their conversion into digital data. It is to be understood, however, that the computer itself may be programmed to perform the equivalent of such a phase shift after conversion.

The above and other features of our invention will be described in detail hereinafter with reference to the accompanying drawing in which.

Figure 1:
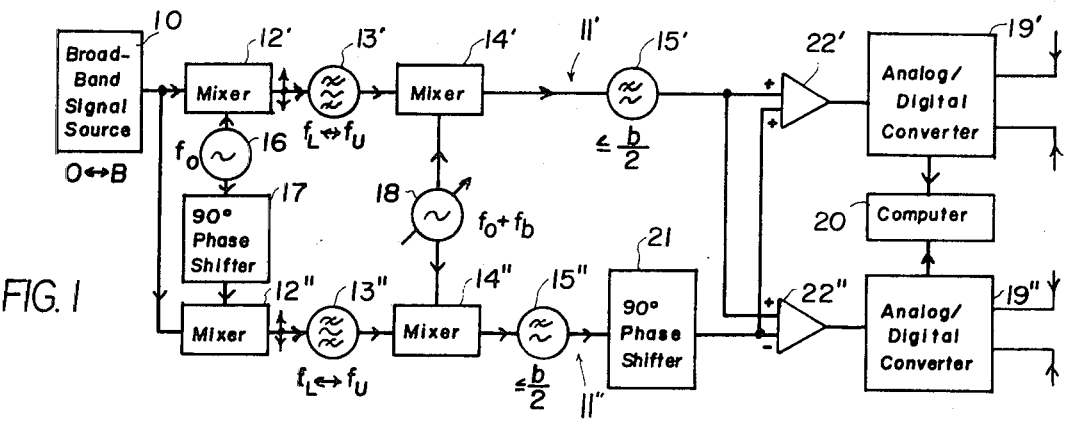
FIG. 1 is a block diagram of a signal analyzer embodying our invention.

In FIG. 1 we have shown a broadband signal source 10 which may comprise the output of an electroacoustic transducer, an electromechanical vibration sensor or any other device given rise to a spectrum of electromagnetic oscillations. This source works into a pair of parallel channels 11', 11'' each including a respective mixer 12', 12'', a band-pass filter 13', 13'', another mixer 14', 14'' and a low-pass filter 15', 15''. A local oscillator 16 delivers a fixed shift frequency $f_o$ directly to mixer 12' and through a 90° phase shifter 17 to mixer 12''. Another local oscillator 18 feeds a variable output frequency $f_o+f_b$ to both mixers 14', 14''. Filters 13' and 13'', inserted between mixers 12', 12'' and 14', 14'', have pass bands with an upper frequency limit $f_u>f_o+B$ and a lower frequency limit $f_l<f_o-B$; filters 15' and 15'' have a cutoff frequency at $b/2$.

Signal channels 11' and 11'' terminate at a pair of analog/digital converters 19', 19'' working into a computer 20 equipped to perform an FFT analysis within a band limited by an upper frequency F.

Figure 2:
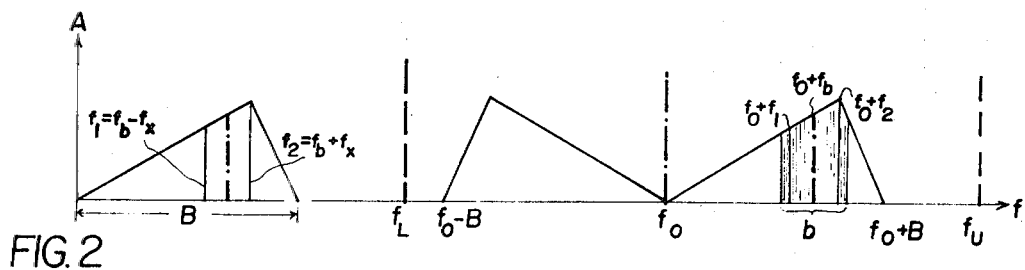
FIG. 2 is a frequency diagram relating to the operation of the system of FIG. 1.
Figure 3:
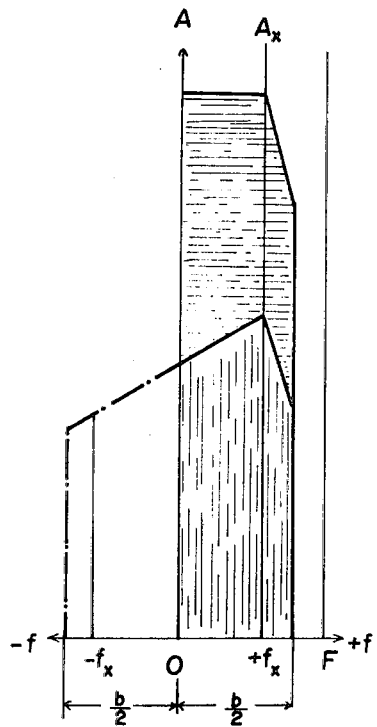
FIG. 3 is a graph showing a transposed subband of frequencies for the diagram of FIG. 2.

The operation of the system so far described will now be explained with reference to FIGS. 2 and 3 in which signal amplitude A is plotted against frequency $f$. The signal band B, emitted by source 10, is assumed to extend from $f=0$ to well beyond the limiting frequency F (see FIG. 3) of computer 20. Upon modulation with shift frequency $f_o$ in, say, mixer 12', band B is elevated to a range between $f_o-B$ and $f_o+B$ in the form of an upper and a lower sideband of carrier $f_o$. All other modulation products, including particularly the harmonics of frequency $f_o$ (if the output of oscillator 16 is not a pure sinusoid) and the sidebands flanking these harmonics, are eliminated by the filter 13' which also removes the original band B. It will be noted that this filter need not have a very sharp upper or lower cutoff in view of the considerable spacing of the active frequency bands.

Next, the output of filter 13' is heterodyned with beat frequency $f_o+f_b$ to select a subband centered on that beat frequency; this subband is taken from the upper sideband above carrier $f_o$ although, in principle, it could also be selected from the lower sideband by the use of a beat frequency $f_o-f_b$. The modulation of the signal frequencies with the selective beat frequency again gives rise to an upper and a lower sideband, only the latter one being of interest since the former is suppressed by the filter 15'.

Let us consider two signal frequencies $f_1=f_b-f_x$ and $f_2=f_b+f_x$ located within the original band on opposite sides of frequency $f_b$, with the assumption that $f_x$ is below the cutoff frequency $b/2$ of filter 15'. Upon modulation is mixer 12', these two frequencies appear at $f_o+f_1$ and $f_o+f_2$ within a subband $b$ centered on beat frequency $f_o+f_b$. When these signal frequencies are now heterohyned with that beat frequency, they emerge as two low frequencies $\pm f_x$ on either side of the zero axis. The negative frequency $-f_x$, of course, appears on the positive side of the axis and is analytically indistinguishable from the positive frequency $+f_x$. This has been illustrated in FIG. 3 where the negative half of subband $b$ has been shown in dot-dash lines in its theoretical position and in solid lines, superimposed upon the positive half, in its flipped position. At the point $f_x$, therefore, an amplitude $A_x$ appears which corresponds to the vector sum of the original amplitudes of signals $f_1$ and $f_2$; these vectors will not ordinarily be cophasal although having been so indicated in FIG. 3 for purposes of explanation.

Let a signal $A_1 \cos \omega t$ be modulated by an oscillation $A_o \cos \omega t$ where $\omega=2\pi f_1$ and $\alpha=2\pi f_o$. The lower sideband of the resulting modulation products has the form $\frac{1}{2}A_1 A_o \cos(\omega-\alpha)t$. If, now, the oscillation of frequency $f_o$ is shifted by 90° so as to have the form $A_o \sin \omega t$, the lower sideband of the modulation products becomes $-\frac{1}{2}A_1 A_o \sin(\omega-\alpha)t$.

If $\omega>\alpha$, with $\omega-\alpha=\delta$, we may proceed in the same manner with a signal $A_2 \cos \beta t$ where $\beta=2\pi f_2$, with $\omega<\beta$ and $\alpha-\omega=\delta$. The resulting modulation products without and with 90° phase shift, again considering only the lower sideband, have the form $+\frac{1}{2}A_2 A_o \cos \delta t$ and $-\frac{1}{2}A_2 A_o \sin \delta t$, as compared with the vectors $+\frac{1}{2}A_1 A_o \cos \delta t$ and $+\frac{1}{2}A_1 A_o \sin \delta t$ first obtained. Thus, the cosine terms resulting from modulation without phase shift (channel 11') are positive for both frequencies $f_1$ and $f_2$ whereas the sine terms, due to modulation with phase shift (channel 11''), are positive for signal $f_1$ and negative for signal $f_2$. It thus becomes possible to discriminate between signal frequencies $+f_x$ and $-f_x$, respectively derived from frequencies $f_1$ and $f_2$ in mixers 14' and 14'', either within the computer 20 itself or in the input circuitry thereof so that the computer will have available the complete information required for FFT analysis.

An an example of circuitry designed to separate the upper and lower halves of the subband $b$ fed to the computer, we have shown in FIG. 1 a 90° phase shifter 21 inserted in channel 11'' beyond low-pass filter 15''. The output of this phase shifter 21 is additively combined with that of filter 15' in an amplifier 22', working into converter 19', and is subtractively combined with that filter output in an amplifier 22'' working into converter 19''.

In general, the shift frequency $f_o$ should be substantially higher than $2B$ in order to enable convenient suppression of the original signal band by the lower cutoff frequency $f_L$ of filter 13' or 13''. The upper cutoff frequency $f_U$ of this bandpass filter should normally be below $2f_o$ although, if the oscillator 16 is properly balanced so as to generate no even harmonics, this cutoff frequency could be increased to a value somewhat less than $3f_o$.

Since all higher harmonics of the outputs of both oscillators 16 and 18 are well outside the passband of filters 15' and 15'', these oscillators can be represented by square wave generators or multivibrators, the mixers 12', 12'' and 15', 15'' being then simple gates.

Figure 4:
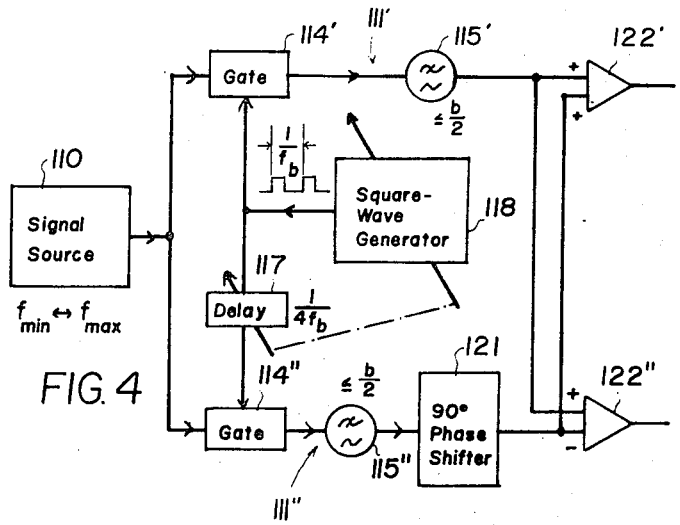
FIG. 4 is a block diagram similar to FIG. 1, illustrating a modification.

If the original signal band does not start at $f=0$ but ranges between an upper frequency $f_{max}$ and a lower frequency $f_{min}$ higher than $f_{max}/2$ (or $f_{max}/3$ in the case of a balanced oscillator), the first modulation stage 12', 12'', 16 of FIG. 1 may be omitted. In this case, of course, the 90° phase shifter 17 will have to be placed in one of the outputs of oscillator 18 and should be switchable together with that oscillator to provide the proper phasing for every selected beat frequency. A system of this type has been illustrated in FIG. 4 where a source 110, whose output of bandwidth B lies in the aforementioned range $f_{min}-f_{max}$, works into a pair of channels 111', 111'' comprising respective gates 114', 114'' and low-pass filters 115', 115''. A local oscillator 118 is a square wave generator of period $1/f_b$ coupled with a delay device 117 designed to introduce the necessary phase shift, in the form of a lag equal to $1/4f_b$, in the control circuit of gate 114''. The outputs of low-pass filters 115' and 115'' are again fed, with interposition of a 90° phase shifter 121, to a pair of amplifiers 122', 122'' supplying a computer in the manner illustrated in FIG. 1.

The aforedescribed shifting of the signal band to prevent the appearance of harmonics of the modulating frequencies within that band are particularly important in cases where the entire band B, or a substantial portion thereof, is concurrently scanned by several sections of the computer operating on different beat frequencies $f_b$; in such a case the elements of FIG. 1 to the left of mixers 14' and 14'' can be common to all the computer sections whereas these mixers along with the remainder of the circuit are individual to each section. With consecutive sampling of the band B only the lowest subband (between 0 and $b$) would possibly include a harmonic ($b$) of the corresponding beat frequency ($b/2$) so that a shift to a higher frequency range would be required only for that subband and in the presence of an imperfectly balanced local oscillator. Naturally, sequential rather than concurrent sampling allows for a more exact exploration of each subband with a computer of given capacity, albeit at the expense of a reduced overall operating speed.

Thus, the entire band B may be explored by the successive or simultaneous generation of N beat frequencies $f_{b1}=b/2$, $f_{b2}=3b/2$, $f_{b3}=5b/2$, ..... $f_{bN}=(2N-1)b/2$, with a separation equal to $b$, which (in the system of FIG. 1) are added to or subtracted from the carrier frequency $f_o$. The possibility of connecting several pairs of channels, receiving these beat frequencies, between filters 13', 13'' and converters 19', 19'' has been indicated diagrammatically in FIG. 1.

We claim:

1. A method of analyzing physical phenomena, translatable into a broad band of electromagnetic signal frequencies, with the aid of a computer capable of performing mathematical power-spectrum analyses in a range of frequencies whose upper limit F is a fraction of the width B of said band of input frequencies, comprising the steps of:
   subdividing said band of signal frequencies into a plurality of subbands of width $b$ by selecting a plurality of beat frequencies $f_b$ each centered in the respective subband, with $b/2 \leq F$;
   simultaneously heterodyning said band with a selected beat frequency in two parallel channels with a shifting of the phase of the selected beat frequency with reference to the phases of said signal frequencies by substantially 90° as between said channels, thereby generating modulation products including a lower sideband and an upper sideband flipped into an overlapping position near the zero-frequency axis of an amplitude/frequency diagram;
   filtering all frequencies above $b/2$ from the modulation products of each channel;
   converting the remainder of said modulation products into digital data;
   and feeding said digital data to the computer.

2. A method as defined in claim 1 wherein said band is transposed to a range of higher frequencies before heterodyning with said beat frequencies by modulation of said signal frequencies with a shift frequency $f_o>B$.

3. A method as defined in claim 2 wherein said band of signal frequencies is separately modulated with said shift frequency in each of said channels, said shifting of the phase being accomplished by transmitting to said channels two oscillations of said shift frequency $f_o$ in quadrature relationship with each other.

4. A method as defined in claim 1 wherein the step of heterodyning comprises interrupting the transmission of said band over said channels in the rhythm of two relatively dephased square waves having the selected beat frequency $f_b$.

5. A method as defined in claim 1 wherein the modulation products of said channels are additively and subtractively combined, after a relative phase shift by 90°, to separate said lower and upper sidebands before conversion into digital data.

6. A system for analyzing physical phenomena, comprising:
   a source of electromagnetic signal frequencies representative of the phenomena to be analyzed, said input frequencies ranging over a broad band of width B;
   variable oscillator means for selectively generating a plurality of beat frequencies $f_b$ each centered in a respective subband of width $b$ of said broad band;
   computer means capable of performing mathematical power-spectrum analysis in a range of frequencies whose upper limit F is a fraction of said width B but at least equal to $B/2$;

a pair of parallel transmission channels leading from said source to said computer means, each of said channels including mixer means connected to said oscillator means for simultaneously heterodyning said band with a selected beat frequency $b_f$;

phase-shifting means in circuit with at least one of said channels for displacing the phase of said selected beat frequency $b_f$ with reference to the phases of said signal frequencies by substantially 90° as between said channels, thereby generating modulation products including a lower sideband and an upper sideband flipped into an overlapping position ear the zero-frequency axis of an amplitude/frequency diagram;

filter means in said channels for eliminating all frequencies above $b/2$ from the modulation products transmitted thereover;

analog-to-digital converter means in said channels beyond said filter means;

and circuitry for feeding the outputs of said converter means to said computer.

7. A system as defined in claim 6, further comprising a generator of an oscillation of fixed shift frequency $f_o$, said mixer means including two cascaded heterodyning stages in each of said channels, one of said stages in each channel being connected to said oscillator means, the other of said stages in each channel being connected to said generator.

8. A system as defined in claim 7 wherein said phase-shifting means is inserted between said generator and the associated heterodyning stage in one of said channels.

9. A system as defined in claim 7 wherein said filter means comprises a low-pass filter immediately behind each of said heterodyning stages.

10. A system as defined in claim 6 wherein said oscillator means comprises a square wave generator, said mixer means comprising a gate circuit in each of said channels controlled by said generator in the rhythm of its square wave.

* * * * *